United States Patent [19]

Engels

[11] 4,313,509
[45] Feb. 2, 1982

[54] WEIGHING APPARATUS

[75] Inventor: Mathijs M. J. Engels, Koudekerk, Netherlands

[73] Assignee: Maatschappij van Berkel's Patent N.V., Leidschendam, Netherlands

[21] Appl. No.: 118,568

[22] Filed: Feb. 4, 1980

[30] Foreign Application Priority Data

Feb. 5, 1979 [DE] Fed. Rep. of Germany ....... 2904261

[51] Int. Cl.³ ............................................. G01G 23/01
[52] U.S. Cl. .......................................... 177/50; 73/1 B
[58] Field of Search ............ 177/3, 4, 25, 50, 210 FP, 177/164, 165, DIG. 3; 73/1 B; 364/466, 567

[56] References Cited

U.S. PATENT DOCUMENTS

| | | | |
|---|---|---|---|
| 3,565,194 | 2/1971 | Engle | 177/50 |
| 3,851,151 | 11/1974 | Stambera | 364/466 X |
| 4,070,900 | 1/1978 | Engels | 73/1 B |
| 4,084,242 | 4/1978 | Conti | 364/466 |
| 4,137,979 | 2/1979 | Itani | 177/210 R |
| 4,156,361 | 5/1979 | Melcher | 73/1 B |

*Primary Examiner*—Joseph W. Hartary
*Attorney, Agent, or Firm*—Lloyd L. Zickert

[57] ABSTRACT

Weighing apparatus for measuring loads and/or calculating the value of loads which includes a weighing device and an evaluating device. The weighing device is provided with a movement responding to the load being weighed and producing a corresponding electrical measurement signal, while the evaluating device translates the electrical measurement signal into a digital readout and also is capable of calculating the value of the load in accordance with a scheduled value for the load being weighed. An electrical cable connects the evaluating device with the weighing device for the purpose of transmitting electrical signals from the weighing device to the evaluating device. A data storage unit is permanently connected to the weighing device for storing constants that modify the output of the movement to compensate for errors inherent in the movement when it is manufactured. Additionally, the data storage device may contain constants for correcting the electrical signal going to the evaluating device in accordance with the environmental conditions in which the weighing apparatus is operated. The data storage unit is sealed and therefore tamperproof and may be located within the housing of the weighing device or in a coupling member attached to the electrical signal transmitting cable extending between the weighing device and the evaluating device, wherein the cable is permanently secured to the weighing device. The coupling member is structured to mate with a coupling member on the evaluating device whereby the weighing device may be used with any evaluating device and be capable of producing accurate weight measurements.

10 Claims, 6 Drawing Figures

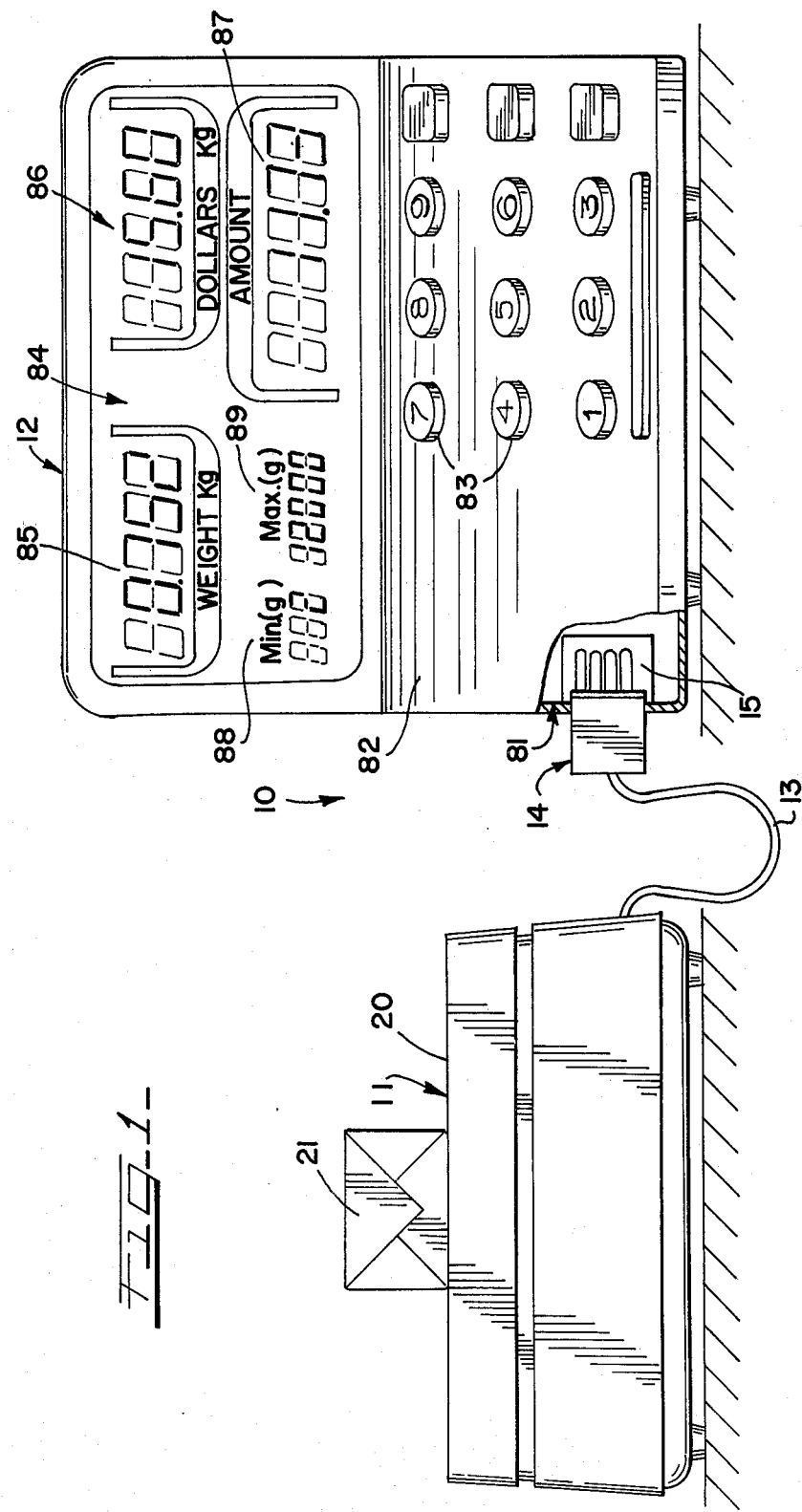

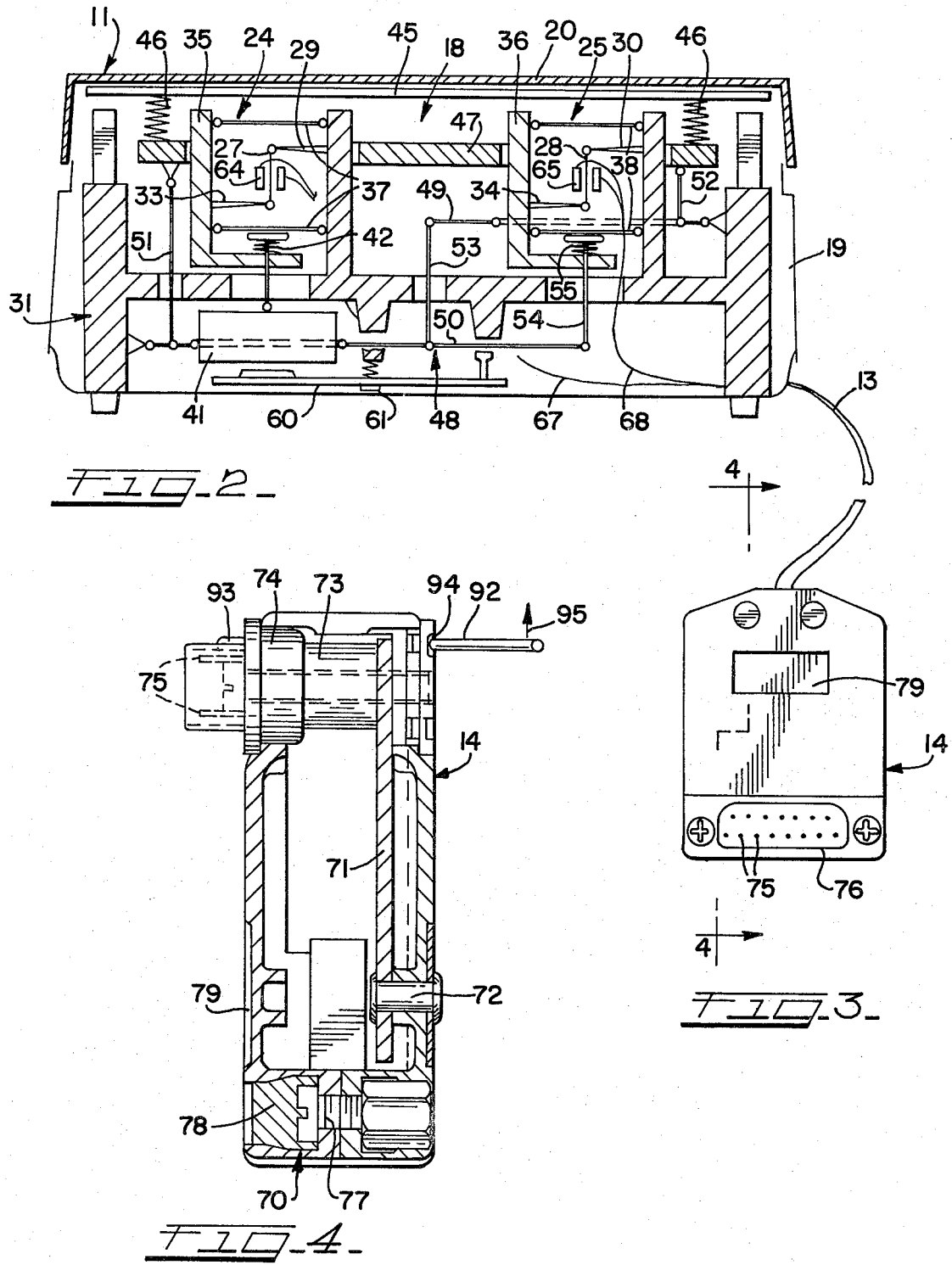

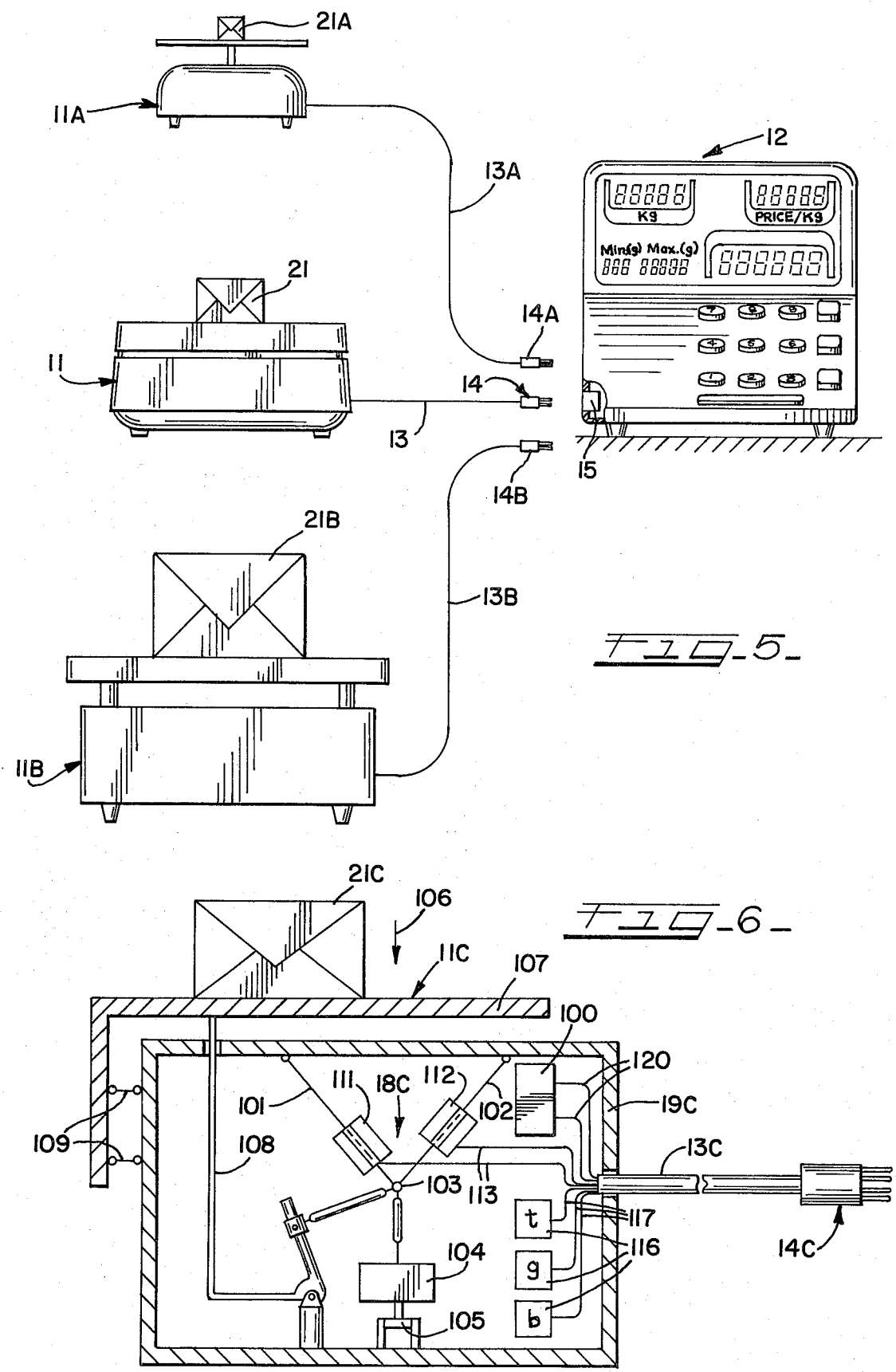

WEIGHING APPARATUS

This invention relates in general to a weighing apparatus having a weighing device and an evaluating device, and more particularly to a weighing apparatus wherein corrections for errors inherent in the weighing device are made in a data storage unit permanently associated with the weighing device so that the weighing device may be connected to any evaluating device and produce correct weight measurements.

The weighing apparatus of the present invention generally includes a weighing device of the type having a movement with vibrating or oscillating strings which will produce electrical measurement signals corresponding to the weight of the object being weighed and an evaluating device connected to the weighing device having means for translating the signals for digital display of the weight and calculating the price value of the object being weighed in accordance with a chosen price-per-unit weight and digitally displaying the price value and the price-per-unit weight. Additionally, the evaluating device may include a keyboard for inputting price data relating to the commodity being weighed as a price-per-unit weight value and/or other display capability and a printer for recording on a check slip or the like all or part of the digitally displayed information and/or other information.

Heretofore, it was well known to provide a weighing device with a vibrating string type movement wherein calibration was accomplished by the adjustment of numerous mechanical elements which were costly to manufacture and time-consuming to adjust. It was also known to connect an evaluating device to the weighing device for digitally displaying weight and for calculating the price value of a commodity being weighed, and to calibrate the movement to produce correct weight measurements through operation of the evaluating device, such as disclosed in U.S. Pat. No. 4,070,900. In such an arrangement the weighing device was not pre-calibrated, and if it was exchanged for another, the replacement had to be calibrated. Calibration of the movement of the weighing device corrects for static errors. It was also known to calibrate a movement to correct for dynamic errors caused by variations in temperature, vibrational or gravitational conditions in a given environment. This is also shown in the above-mentioned patent. In such an arrangement, it was only possible to use an evaluating device having the necessary components for compensating for such errors.

The present invention overcomes the difficulties heretofore encountered by providing in a weighing apparatus for weighing and calculating the value of loads or commodities which includes a weighing device with a data storage unit having constants programmed into the unit to correct static and/or dynamic errors and which enables the weighing device to be coupled to any evaluating device for performing the necessary weighing and calculating operations and to provide accurate weight measurements. Thus, according to the invention a single evaluating device may have alternately connected thereto any one of several weighing devices, each of which might have different types of movements and each of which might have different measuring capacities and sensitivities, but all of which would have a data storage unit which would correct for static and/or dynamic errors. Such a weighing device would have a movement which would produce electrical measurement signals that would be modified by the data storage unit to provide a corrected electrical signal that could be used with any evaluating device. Further, the data storage unit according to the invention would be tamperproof, that is, it would be sealed so that it could not be adjusted or modified by the user. Still further, the data storage unit would be permanently connected to the weighing device.

In one form the data storage unit could be mounted within the housing of the weighing device and in another form it could be mounted in a coupling member carried on the end of an electrical cable permanently connected to the weighing device, which coupling member would detachably mate with a coupling member on the evaluating device. The storage data unit would carry the specific constants that characterize the movement of the weighing device so that the electrical signals produced by the movement would be modified to provide accurate measurements. With an integrated storage unit for a weighing device, it can be readily seen that the weighing device could be connected and used with any standard evaluating device, and when so used, no additional adjustment need be made of the movement of the weighing device in order to perform correct and accurate weight measurement operations. With the advent of PROM technology available today, it can be appreciated that the necessary constants for a particular movement of a weighing device can be quickly and easily entered into a storage unit and ready the weighing device for use by the ultimate user. In this respect, every weighing device with whatever type movement is utilized that would produce electrical measurement signals would have its own data storage unit that would be programmed to produce electrical signals of accurate measurement quality.

The present invention eliminates the need for the components and processes heretofore required for performing settings and adjustments within the movement of the weighing device. For example, the present invention eliminates the need to heretofore include a plurality of vibrating strings connected together at given angles and to be actuated at a given angle with a measuring force supplied by the object or commodity being weighed and a reference force, so that errors in linearity, zero load or the like can be overcome. Rather, the present invention allows a single vibrating string to have applied thereto a measurement force and a second vibrating string to have applied thereto a constant reference force where all corrections for stationary errors are entered in the form of constants into the data storage unit. Additionally, as above noted, the data storage unit could have programmed therein constants for accommodating the weighing device in a particular environment to correct for dynamic variations. For example, if it is known that the weighing device would be used in an environment where corrections for temperature, gravity and/or vibration would provide a more accurate weight measurement, such would be programmed into the data storage unit and again sealed and made tamperproof prior to delivery of the weighing device to the ultimate user in the particular environment.

As already mentioned, it is important that a weighing device according to the present invention having a movement and a data storage unit with the programmed corrections for the movement so that accurate electrical measurement signals are produced be usable with a standard evaluating device having a universal display. Such a universal display would not only include a display of the weight of an object but also the price-per-unit weight scheduled for the object and the computed total value of the object according to the weight and price-per-unit weight. Additionally, the display could include data indicating the sensitivity of the movement in the weighing device as well as the measurement capacity of the movement so that an operator would be informed as to the capability of the weighing device. Further, the type of movement in the weighing device could also be visually indicated on the display by a number or symbol in a display window of the evaluating device. Finally, a tare weight measurement of the packaging could also be shown in the display. In addition to a visual display, the evaluating device may also include a printer for recording data on a check slip or a label that may be subsequently affixed to the commodity or otherwise used.

It is therefore an object of the present invention to provide a weighing apparatus including a weighing device and an evaluating device which weighs loads produced by objects or commodities and wherein the weighing device includes a movement that will produce an electrical measurement signal which is modified to correct for static and/or dynami conditions so that the weighing device may be used with a standard evaluating device to perform accurate weight measurements.

Another object of this invention is in the provision of a weighing device for a weighing apparatus wherein the weighing device is adapted to be used with an evaluating device and includes a movement that produces electrical measurement signals together with a data storage unit having constants entered thereinto for modifying the electrical measurement signal to provide a corrected signal that can be utilized with any evaluating device.

Another object of the present invention is to provide a weighing device for producing an electrical measurement signal and having a data storage unit permanently associated with the weighing device to correct the signal for errors inherent in the movement so that accurate measurements can be made.

A still further object of this invention is in the provision of a weighing device having a data storage unit for receiving constants to provide accurate weight measurements wherein the data storage unit is mounted in a coupling member permanently attached on the end of a cable that is connected to the movement of the weighing device and which coupling member mates with a coupling member of an evaluating device.

Other objects, features and advantages of the invention will be apparent from the following detailed disclosure, taken in conjunction with the accompanying sheets of drawings, wherein like reference numerals refer to like parts, in which:

FIG. 1 is a front elevational view of a weighing apparatus according to the present invention showing the weighing device and the evaluating device and showing diagrammatically a plug or coupling member permanently connected to the weighing device and coupled to a mating coupling member of the evaluating device wherein the coupling member has a data storage unit incorporated therein;

FIG. 2 is a longitudinal sectional view taken through the weighing device of FIG. 1;

FIG. 3 is an enlarged view of the plug attachable to the cable coming from the weighing device;

FIG. 4 is an enlarged sectional view taken along line 4—4 of FIG. 3;

FIG. 5 is a composite view of a single evaluating device and three different weighing devices with different movements to illustrate that the single evaluating device can be used for any of the three weighing devices and provide the necessary and desirable proper weight measurement operations; and FIG. 6 is a schematic sectional view taken through a form of weighing device with another form of movement different from that illustrated in FIG. 2.

Referring now to the drawings and particularly to the embodiment shown in FIGS. 1 to 4, the weighing apparatus is illustrated and generally designated by the numeral 10 and includes generally a weighing device 11 and an evaluating device 12, each of which is in its respective housing, whereby they may be positioned independently of one another and interconnected by means of an electrical cable or line 13, one end of which is permanently connected thereto and the other end of which is connected to a plug enclosing a data storage unit, as will be more clearly explained hereafter. The plug 14 mates with a socket 15 in the evaluating device to electrically interconnect the weighing device and the evaluating device. The plug 14 may be defined as a coupling member on the end of the cable 13, while the socket 15 may be defined as a coupling member mounted on the evaluating device 12, both of which permit easy decoupling so that the weighing device 11 may be interchanged with another weighing device if so desired.

It will be appreciated that the weighing device 11 will be of a type having a movement such as generally indicated by the numeral 18 in FIG. 2 located within a housing 19 and actuatable by movement of a platform or pan 20 to produce an electrical measurement signal corresponding to the weight of an object or load received on the pan 20. A packaged load or object is shown on the pan 20 and indicated by the numeral 21 in FIG. 1 for illustrating the application of a load or weight to the load pan.

The movement 18 illustrated in FIG. 2 includes measuring cells with oscillating or vibrating strings. A measuring cell 24 is acted upon by a reference weight, while a cell 25 is acted upon by the weight of the object on the loading pan 20. Respectively, cells 24 and 25 include vibrating or oscillating strings 27 and 28 attached at their upper ends to supports 29 and 30 carried by vertical portions of a frame 31. The lower ends of the strings are respectively secured to supports 33 and 34 extending from vertical legs of movable members 35 and 36 that are connected to the frame 31 by parallelogram linkages 37 and 38.

The string 27 in the reference cell 24 is acted upon solely by a reference weight 41 which is connected to a horizontal arm of the movable member 35 through an overload safety device 42. The string 28 in the cell 25 is acted upon solely by the weight of an object received on the weighing pan 20 which applies a force through a plate 45 and spring members 46 to a load bridge member 47. The bridge 47 is supported on the frame 31 by a system of levers 48, which system includes horizontally extending levers 49 and 50 pivotally connected to the frame 31 and to the bridge 47 by vertical links 51 and 52. The levers 49 and 50 are interconnected by a coupling link 53 which also extends vertically. A coupling rod 54 connects the system of levers to the cell 25 and specifically through the horizontal lever 50 and through an overload safety device 55 to the horizontal arm of the movable member 36. The levers 49 and 50 are respectively structured with annular or the like portions which freely fit around the measuring cell 25 and the reference weight 41. If it is desired to lock the reference weight 41 to be stationary, a locking lever 60 is provided which is actuated by a spring-loaded bolt 61.

The strings 27 and 28 are respectively excited by combination excitation and sensing units or heads 64 and 65 which transmit the frequencies generated by the strings through conductors 67 and 68 to the cable 13 that is permanently attached to the weighing device.

The plug 14 on the end of the cable 13 includes a segmented housing 70 within which is located a printed circuitboard 71 that is secured to the housing by a fastener 72. The fastener may be a rivet or any suitable device which will hold the printed circuitboard in place. One or more components of a data storage unit or memory element which includes a PROM is carried by the circuitboard. For purposes of further describing the invention, reference will be made to the circuitboard 71 as being the data storage unit. A coupling element 73 is carried by the printed circuitboard for connection to the conductors in the cable 13, and a module 74 extending from the coupling element 73 includes a plurality of pins or socket elements 75, fifteen in number, arranged in two rows within a protective sleeve 76. The two parts of the housing 70 are interconnected by fasteners 77, the head ends of which are concealed by a seal 78, thus rendering the data storage unit 71 within the housing inaccessible and tamperproof. As illustrated in FIG. 3, a space or window 79 is provided on the exterior of one part of the housing for application of details of the capacity sensitivity and other features of the movement of the weighing device.

It will be appreciated the data storage unit 71 retains all of the specific data in the form of constants and the like for the movement 18 of the weighing device 11. This will eliminate any need for adjustments of the weighing device when it is used with the evaluating device 12.

The evaluating device 12 includes a housing 81 having a sloping front panel 82 with a conventional keyboard 83 for inputting the price-per-unit weight of the commodity 21. Above the sloping panel a large display window 84 includes several sections in which may be digitally displayed weight and price values. The individual digits of any section are formed, for example, by the conventional seven-segment method, wherein the display section 85 shows the weight of the object being weighed in suitable weight units, such as kilograms. The display section 86 shows the price-per-unit weight programmed into the evaluating device for the particular commodity being weighed, such as in dollars-per-kilogram. Display section 87 shows the total calculated price of the commodity based upon the weight and price-per-unit weight in a currency value, such as dollars. Display section 88 shows the sensitivity of the weighing device 11 and display section 89 shows the maximum weight capacity of the weighing device 11, the latter two values being in grams or any other suitable unit of weight measurement.

The electrical measurement signals or pulses and the constants received by the evaluating device through the plug 14 are evaluated by the calculating elements (not shown) of the evaluating device in the nature of a polynome of the nth degree. The data storage unit 71 feeds the constants for the calculation, and it will be appreciated that the frequency ratio of the two vibrating strings 27 and 28 is received by the calculating elements as a measurement signal so that the weight value is determined accordingly. Thus, the zero position of the particular movement of the weighing device and its linearity and other static conditions are corrected arithmetically. The value of the weight of the commodity 21 then appears digitally in the display section 85 and as shown is 0.752 kilograms. The price-per-unit weight for the commodity 21 is entered into the calculating device by the keyboard 83 and appears as $15.60 per kilogram in the display section 86, and the calculated total value of the commodity is then shown as being $11.73 in the display section 87. The sensitivity and weight capacity of the weighing device 11 are respectively shown in display section 88 as two grams and in the display section 89 as 12,000 grams or 12 kilograms. Accordingly, the commodity 21 is weighed on the weighing device 11 to the degree of accuracy of two grams and the maximum weight capability is 12 kilograms.

It will be appreciated that in the event the weighing device 11 or the evaluating device 12 malfunctions, either device may be easily replaced as they are exchangeable with other components, while the particular characteristics of the movement of a weighing device are always maintained by the weighing device in the data storage unit 71.

The plug 14 is retained in place on the evaluating device by a retaining clip 92 which pivots with angled shank ends 93 on the housing 70 (not shown in detail). The clip 92 includes an S-shaped spring-loaded rear portion engaging in a retaining slot 94 on the outside of the plug housing 70. To disengage the clip, it need only be turned back in the direction indicated by the arrow 95 which enables the pin 75 to be withdrawn from the mating sockets in the coupling socket member 15.

It is illustrated in FIG. 5 how a standard evaluating device can be utilized with different weighing devices. The evaluating device 12 is the same as illustrated in the embodiment of FIG. 1 and is capable of having connected thereto for weighing operations any one of the three different weighing devices 11, 11A and 11B. It may be appreciated that the weighing device 11 is identical to that in the embodiment of FIG. 1, and it can be used with evaluating device 12 interchangeably either with weighing device 11A or weighing device 11B. The weighing device 11A is illustrated as weighing a commodity 21A and having a cable 13A terminating in the plug 14A within which it includes its own data storage unit. Similarly, the weighing device 11B is illustrated as weighing the commodity 21B and is provided with a cable 13B terminating with the plug 14B within which it has its own data storage unit. The data storage units of each weighing device have constants which are characteristic of each device so that accurate weight measurements are delivered to the evaluating device 12.

The embodiment of FIG. 6 illustrates that the data storage unit need not be housed within the plug which couples to the coupling member of the evaluating device but may be included within the housing of the weighing device. The weighing device here is generally identified by the numeral 11C and includes a cable 13C terminating in a plug 14C. The movement of the weighing device is generally indicated by the numeral 18C and located within the housing 19C of the unit. The data storage unit for this embodiment is arranged within the housing and indicated by the numeral 100 and has entered therein the constants for adjusting the measurement signal produced by the weighing device 18C to provide a correct and accurate measurement signal to be delivered to the evaluating device 12. In this embodiment the movement includes vibrating strings 101 and 102 secured at one end to the housing and tied together at 103 in a given angle. A reference weight 104 is connected to the tied end 103 and associated with a damper 105. The weight of the object 21C is diagrammatically illustrated by the arrow 106 which is applied to the loading platform 107 and transmitted through a system of levers 108 to the tied point 103 of the vibrating strings 101 and 102. The loading pan 107 is supported on the housing 19C by a system of levers 109 such that the force of the object being weighed will be applied vertically to the lever system 108. Excitation and sensing units 111 and 112 are provided for the strings 101 and 102 respectively and connected by conductors 113 to the cable 13C.

Sensors 116 actuatable by temperature, gravity acceleration at the location of the weighing device, and vibrations affecting the housing 19C transmit correction data on the basis of the values produced by them through conductors 117 to the cable 13C.

Thus, measuring signals are transmitted along conductors 113 to the evaluating device, while constants characterizing the movement are electrically transmitted from the data storage device 100 along conductors 120 to the evaluating device and signals concerning temperature, gravity and vibrations are transmitted along conductors 117. The evaluating device then utilizes these signals to provide the corrected and accurate weight measurement and signals for calculating the total value of the commodity based on the price per unit of weight as well as the digital display of the weighing device characteristics. In this embodiment, the data storage unit is permanently connected to and associated with the weighing device as in the previous embodiment. Thus, corrections are provided not only for the static conditions of the weighing device but also for dynamic conditions.

It can be appreciated that further display sections may be provided on the evaluating device for displaying other information, such as the exact type of movement in the weighing device in the form of symbols or numbers which could be held by the data storage unit. It may be further appreciated that while the weighing apparatus of the present invention is shown as being in two separate housings, the weighing device and the evaluating device could be enclosed within a single housing wherein within such a housing the data storage unit could also be located.

It will be understood that modifications and variations may be effected without departing from the scope of the novel concepts of the present invention, but it is understood that this application is to be limited only by the scope of the appended claims.

The invention is hereby claimed as follows:

1. In a weighing apparatus for measuring loads and for calculating the value of loads, which apparatus includes a weighing device having an unadjustable movement for producing an electrical signal corresponding to the load being weighed, an evaluating device for digitally reading out the weight of the load and/or the value of the load according to a given value schedule, and cable means permanently connected to the weighing device and detachably connectable to the evaluating device to transmit the electrical weight measuring signals from the weighing device to the evaluating device, the improvement in means for calibrating the movement of provide accurate weight measurements and to enable the weighing device to be used with any evaluating device comprising, a data storage unit, said data storage unit having predetermined constants calibrating the weighing device to cause the unit to produce correct weight measurements when the unit is connected to any evaluating device, and means permanently connecting said data storage unit to cable means of the weighing device.

2. The apparatus defined in claim 1, wherein said means permanently connecting said data storage unit to said weighing device includes a coupling means connected to said cable means detachably mating with coupling means mounted on said evaluating device, and said data storage unit being mounted in said cable coupling means.

3. The apparatus defined in claim 2, wherein said data storage unit in said cable coupling means is tamperproof.

4. The apparatus defined in claim 1, wherein said constants modify the electrical signals produced by the weighing device to correct for movement construction variations such as errors in zero load, linearity or the like.

5. The apparatus defined in claim 1, wherein said constants modify the electrical signals produced by the weighing device to correct for movement construction variations such as errors in zero load, linearity or the like, and for dynamic variations, such as temperature, vibration and gravity.

6. The apparatus defined in claim 5, wherein the data storage unit includes constants for the movement on the weight measuring range and sensitivity, and the evaluating device includes displays for said data.

7. The apparatus defined in claim 1, wherein said evaluating device includes display windows for visually reading the weight, price-per-unit weight, and value of the load being weighed.

8. The apparatus defined in claim 7, wherein the evaluating device includes a printer for printing onto a slip the visually readable values.

9. The apparatus defined in claim 1, wherein the evaluating device includes a universal digital display means, whereby weighing devices of various kinds with their data storage units can be used with the evaluating device.

10. In a weighing apparatus for measuring loads including a load receiving unit having a movement for producing an electrical measurement signal, and an evaluating device for receiving said signal and converting same into a digital readout, the improvement being in means interconnecting the load receiving unit and the evaluating device which comprises, a cable permanently attached to the load receiving unit and having coupling means on the free end thereof, said evaluating device having coupling means for receiving the cable coupling means of the load receiving unit, and a data storage unit in the cable coupling means having predetermined constants calibrating the movement to produce correct weight measurements when connected to any evaluating device.

* * * * *

UNITED STATES PATENT AND TRADEMARK OFFICE
CERTIFICATE OF CORRECTION

PATENT NO. : 4,313,509

DATED : February 2, 1982

INVENTOR(S) : Mathijs M. J. Engels

It is certified that error appears in the above-identified patent and that said Letters Patent are hereby corrected as shown below:

Col. 3, line 24, change "dynami" to --dynamic--

Signed and Sealed this

First Day of June 1982

[SEAL]

Attest:

Attesting Officer

GERALD J. MOSSINGHOFF

Commissioner of Patents and Trademarks